(12) United States Patent
King et al.

(10) Patent No.: US 9,608,869 B2
(45) Date of Patent: Mar. 28, 2017

(54) ENTERPRISE APPLICATIONS NAVIGATION USING TILE CHARACTERISTICS THAT CHANGE WITH APPLICATIONS DATA

(71) Applicant: Oracle International Corporation, Redwood Shores, CA (US)

(72) Inventors: Nigel King, San Mateo, CA (US); Joseph Goldberg, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 292 days.

(21) Appl. No.: 14/033,362

(22) Filed: Sep. 20, 2013

(65) Prior Publication Data

US 2015/0089448 A1 Mar. 26, 2015

(51) Int. Cl.
*H04L 12/24* (2006.01)
*G06F 17/30* (2006.01)
*G06Q 10/06* (2012.01)
*G06F 3/0482* (2013.01)

(52) U.S. Cl.
CPC .......... *H04L 41/22* (2013.01); *G06F 3/0482* (2013.01); *G06F 17/30126* (2013.01); *G06F 17/30572* (2013.01); *G06Q 10/06* (2013.01)

(58) Field of Classification Search
CPC ............ G06F 3/0482; G06F 17/30126; G06F 17/30961; G06F 17/30067
USPC ................. 715/713, 762, 853, 854
See application file for complete search history.

(56) References Cited

U.S. PATENT DOCUMENTS

| | | | | |
|---|---|---|---|---|
| 6,426,761 | B1* | 7/2002 | Kanevsky et al. | 715/788 |
| 8,286,100 | B2 | 10/2012 | Helfman et al. | |
| 2005/0246352 | A1* | 11/2005 | Moore | G06F 17/30067 |
| 2008/0148190 | A1* | 6/2008 | Schaff | G06F 3/0482 |
| | | | | 715/853 |
| 2008/0295038 | A1 | 11/2008 | Helfman et al. | |
| 2010/0281408 | A1* | 11/2010 | Fujioka | G06F 3/04817 |
| | | | | 715/765 |
| 2012/0102410 | A1* | 4/2012 | Gewecke et al. | 715/738 |
| 2013/0042206 | A1 | 2/2013 | Zaman et al. | |
| 2013/0152001 | A1* | 6/2013 | Lovitt et al. | 715/765 |

OTHER PUBLICATIONS

Tile and Tile Notification Overview (Windows Store Apps); obtained at http://msdn.microsoft.com/en-us/library/windows/apps/hh779724.aspx; Sep. 2013; 3 pages.

* cited by examiner

*Primary Examiner* — Christopher J Fibbi
(74) *Attorney, Agent, or Firm* — Trellis IP Law Group, PC (57) ABSTRACT

In example embodiments, space filling elements displayed on a computer screen represent items in one or more levels of a hierarchical menu structure. The area of a space filling element indicates the number of accesses to an application associated with the space filling element. Other attributes of the space filling element may indicate values of characteristics of an associated application.

15 Claims, 9 Drawing Sheets

Fig. 1

Menu has a static position and is placed within the table cell

- ☐ Personal Folders
  - ☐ Deleted
  - ☐ Drafts
  - + ☐ Inbox [20]
  - ☐ Junk Mail
  - ☐ Outbox
  - ☐ Sent Items
  - − ☐ Search Folders
    - ☐ For Follow Up [12]
    - ☐ Large Mail
    - ☐ Unread Mail
- − ☐ Archive Folders
  - ☐ Deleted Items
  - ☐ Sent Items
  - ☐ Search Folders

ENTERPRISE APPLICATIONS NAVIGATION USING TILE CHARACTERISTICS THAT CHANGE WITH APPLICATIONS DATA

BACKGROUND

Many businesses, and other organizations, use software applications or suites of such applications to organize their affairs, track performance, and the like. Such applications, referred to herein as "enterprise applications" are often quite complex, relying on numerous database tables to store and manage data for virtually every aspect of an enterpirse. Merely by way of example, enterprise applications can include supply chain management ("SCM") applications that manage raw materials, work-in-process and/or finished products, coordinate with suppliers, and the like; customer relations management ("CRM") applications that are used to track, store and/or manage customer information; financial management ("FM") applications that track and/or analyze the financial performance of the organization; and human capital management ("HCM") applications that provide management of the human resources functions of the organization. In some cases these enterprise applications are standalone applications; in other cases a suite of applications provides some or all such functionality. One type of enterprise application is referred to as enterprise resource planning ("ERP") software. Examples of enterprise applications include, without limitation, JD Edwards Enterpriseone™, PeopleSoft Enterprise™ applications, and the Oracle eBusiness Suite™ all available from Oracle Corporation.

In many ERP applications access to the many options available is provided by a hierarchical menu structure displayed to the user. Typically the top levels of the hierarchy are more general and the lower levels are more specific. One level of the hierarchy is displayed at a time and the user selects an item of interest to view a lower level in the hierarchy showing more features available for the item of interest.

In the following a hierarchy is an arrangement of objects in which the objects are represented as above, below, at the same level, and having any other type of relationship between objects. Attributes can be assigned and inherited by objects of a menu structure in accordance with a hierarchy of the created menu structure.

SUMMARY

In an example embodiment, space filling elements are displayed on a computer display, with each space filling element representing an item in a level of a hierarchical menu structure providing access to an associated application. The area of each space filling element is in proportion to factor value related to the space filling element.

In an example embodiment, space filling elements are displayed on a computer display, with each space filling element representing an item in a level of a hierarchical menu structure providing access to an associated application. The area of each space filling element represents the number of times an associated application has been accessed.

Accordingly, infrequently accessed applications are either not displayed or displayed using small space filling elements so that the display screen is not cluttered by applications that are infrequently used.

In another example embodiment, attributes of the space filling elements, such as color or texture, are varied to indicate values of variables associated with the application associated with the space filling element. For example, the color attribute could be changed to indicate inclusion in a watch list.

In another example embodiment, the space filling elements are live tiles in a Windows 8® environment where the area of the tiles indicates the number of times the application has been accessed. The tiles also display scrolling notifications to a user.

In another example embodiment, the space filling elements are displayed as a treemap.

A further understanding of the nature and the advantages of particular embodiments disclosed herein may be realized by reference to the remaining portions of the specification and the attached drawings.

DETAILED DESCRIPTION OF EMBODIMENTS

Various embodiments will be described that display a level of a hierarchical menu structure using a space filling element algorithm. In different embodiment the space filling element algorithm maps menu items of an ERP application to rectangular tiles on a display or to elements of a treemap on a display. In one embodiment, each space filling element represents an option in a selected level of the hierarchical menu structure and has attributes that convey information regarding the option. Each space filling element, when activated by a user, invokes an application in a suite of ERP applications.

In the description that follows, embodiments will be described with reference to subsystems on a platform for a software application, such as an ERP application. However, embodiments are not limited to any particular architecture, environment, application, or implementation. For example, although embodiments will be described with reference to ERP applications, aspects of the invention may be advantageously applied to any software application. Therefore, the description of the embodiments that follows is for purposes of illustration and not limitation.

In one embodiment, the size attribute of a space filling element represents the number of times the option mapped to the space filling element has been accessed over a selected time period by a user, a user's team directs, an organization, a social network etc. Thus, the visual representation of the menu level conveys to a user which menu items have been accessed most frequently and provides immediate access to those menu items most used without requiring navigation through the levels of a tree or drop-down representation of the menu.

Other attributes of space filling elements may be varied to indicate activities of the enterprise that affect the importance of a particular option in the displayed level. These enterprise activities can be associated with particular menu items as metadata that can be accessed by a space filling algorithm and used to assign attributes to a space filling element to indicate metadata values.

For example, the color attribute or texture attribute of a space filling element may be varied to indicate that items related to an option represented by a space filling element are overdue or have been indicated by management to be critical. Detailed examples of enterprise activities indicated by changing attribute values are described below.

A hierarchical menu system with visualization functionalities can provide users with the capability to immediately access menu options and make decisions on the importance and other characteristics of the menu options. Visualization components and attributes can emphasize enterprise activity of importance to a user. In one example embodiment, menu options of a selected level of a hierarchical menu system are represented by space filling elements.

In one example embodiment, the space filling elements representing a single level of a menu hierarchy are tiles presented on a computer display with the size and visual attributes of displayed tiles conveying important information regarding enterprise activity relevant to the user or to the user's company or organization.

In another example embodiments the space filling elements are arranged in a treemap format for presentation on a computer display. A treemap is a visual representation of a level of the hierarchical menu system. A treemap generally includes a collection of two-dimensional cells of rectangular shape which are the space filling elements in this embodiment, where each cell represents one or more options of the hierarchical menu system. The cells of a treemap have characteristics or attributes, such as area, color and texture, that represent enterprise activity relevant to the menu option represented by the cell. The cell characteristics may also be known as graphical attributes. Cells may also be specifically grouped to indicate another characteristic such as geographical region or specific product groupings. The enterprise activities may be mapped to different cell characteristics of the treemap visualization. Thus, a viewer of the treemap can gain insight into the importance of a cell by examining a grouping of cells and cell characteristics.

In the described embodiments enterprise activity may include usage history, access by third parties, importance to the users, necessity of a response etc.

Figure 1:
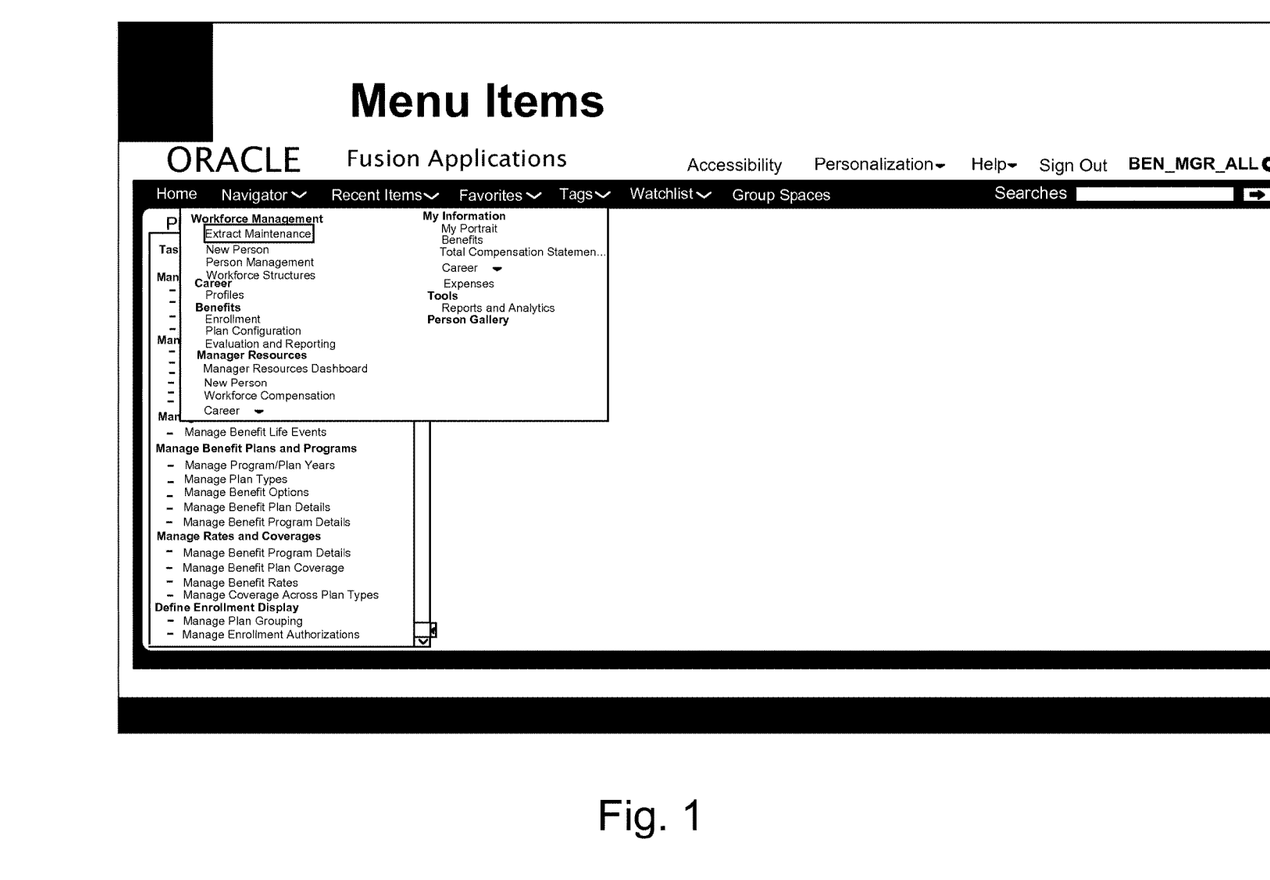
FIG. 1 illustrates an example of a drop-down hierarchical menu.

Hierarchical menus are typically displayed in a tree form or as a pull-down or drop-down menu. FIG. 1 depicts an example of a drop-down hierarchical menu for an ERP application suite, in this example the Oracle Fusion Application suite. The top level includes the options Manage Life Events, Manage Benefit Plans and Programs etc. When one option in the top level is selected then the next level of the hierarchy is displayed as list located in separate window.

Figure 2:
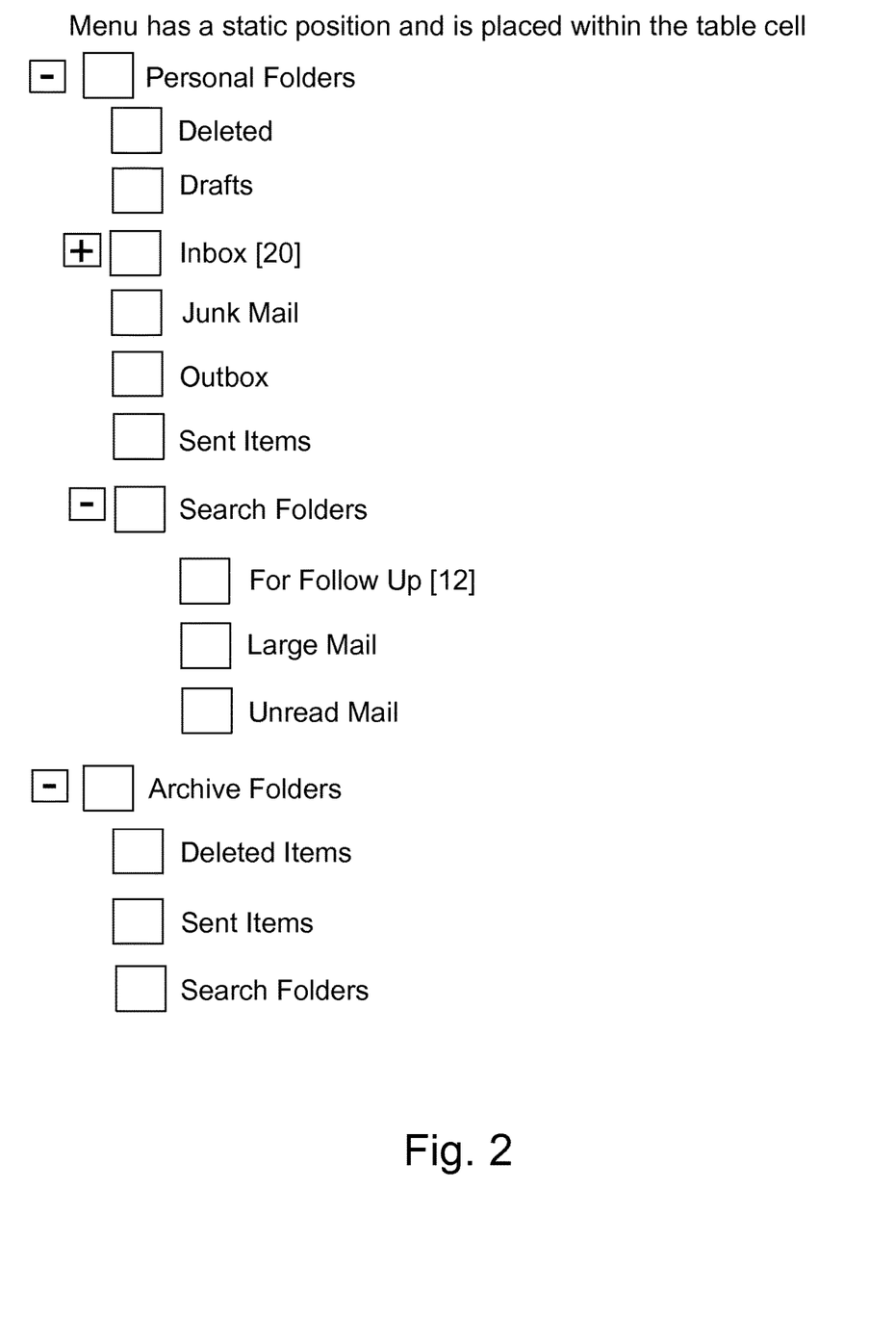
FIG. 2 illustrates a hierarchical tree menu.

FIG. 2 depicts a hierarchical tree menu. The two first levels are Personal Folders and Archive Folders. A box next to an option indicates that the option includes further lower level options. A "+" in the box indicates that the lower level options are not exposed. In this example the Personal Folders levels exposes seven second levels of the hierarchy. Of these second level options the boxes next to Inbox and Search Folders indicate the existence of a third level.

Figure 3:
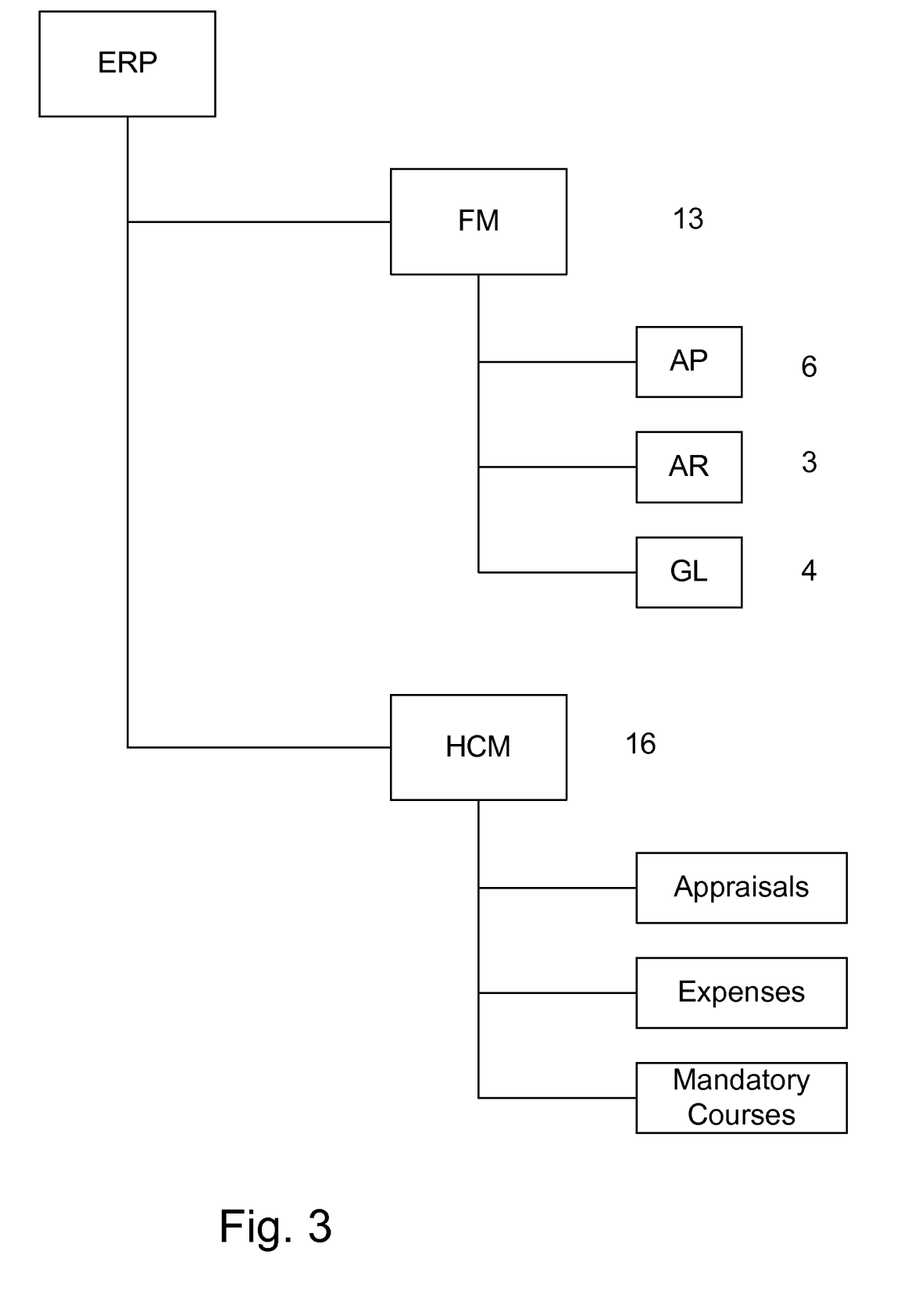
FIG. 3 illustrates an example of a tree menu structure used to illustrate examples of the operation of the example embodiments.

FIG. 3 is an example of a tree menu structure used to illustrate examples of the operation of the example embodiments. FIG. 3 depicts part of the menu structure of an ERP application. In FIG. 3 the first level of the menu hierarchy is represented by the rectangle labeled ERP. Second levels of the ERP level of the hierarchy are represented by rectangles labeled FM (financial management) and HCM (human capital management). A second level of the FM level of the menu hierarchy is represented by the rectangles labeled AP (accounts payable), AR (accounts receivable) and GL (general ledger). A second level of the HCM level of the menu hierarchy is represented by the rectangles labeled Appraisals, Expenses and Mandatory Courses.

In this example, the HCM level has been accessed sixteen times and the FM level has been accessed thirteen times. Further, the accesses to the FM are broken down as six accesses to the AP level, three accesses to the AR level and four accesses to the GL level of the menu structure.

The time periods over which accesses are accumulated can be fixed or be adjustable by the user.

Figure 4:
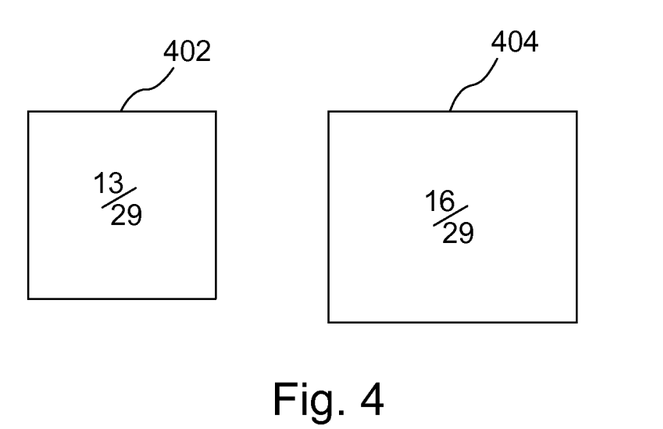
FIG. 4 depicts a space filling element representation of second levels of the ERP menu.

FIG. 4 depicts a space filling element representation of second levels of the ERP menu structure in example embodiments where the size attribute of a tile is changed based on the value of the underlying times accessed variable. In FIG. 4 a first tile 402 is sized to represent the number of accesses to the FM level and a second tile 404 is sized to represent the number of accesses to the HCM level. In this embodiment, the combined areas of the first and second tiles 402 and 404 is equal to 29 units of area, the area of the first rectangle 402 is equal to 13 units of area and the area of the second rectangle 404 is equal to 16 units of area.

Figure 5:
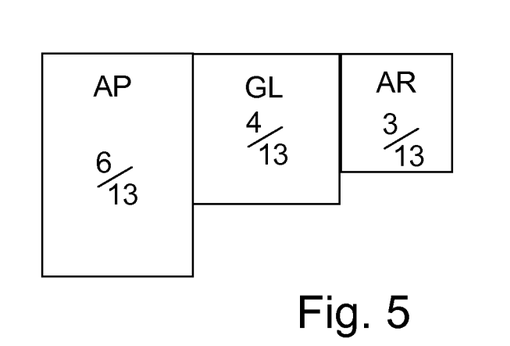
FIG. 5 depicts partitioning a first tile into sub-tiles.

FIG. 5 depicts partitioning the first tile into sub-tiles representing the number of accesses to the AP, GL and AR levels of the menu structure. The areas are equal to 6, 4 and 3 area units respectively.

In an example embodiment where the ERP is the Fusion suite of applications developed by the assignee of the present application, the number of accesses can be determined by integrating the Fusion applications with Oracle Identification Management (OIM) Permission Check Logs.

FIGS. 4 and 5 depict using a tile area attribute to quantitatively indicate the value of an underlying variable. Other tile attributes, such as color and texture, can be used in addition to the area attribute to indicate the values of other variables or convey different types of information.

Figure 6:
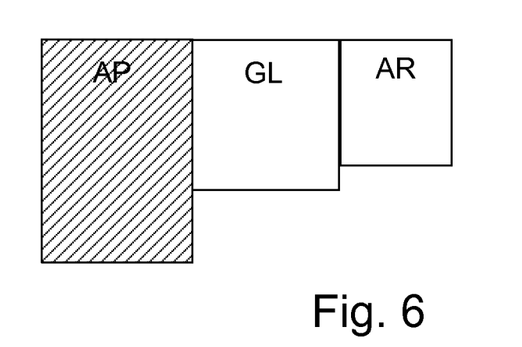
FIG. 6 illustrates a space filling element shaded to indicate that the application needs attention by the user.

In FIG. 6, the AP space filling element is shaded to indicate that the AP application needs attention by the user. The assigning of the shading attribute to the AP space filling element could be triggered by a timing routine indicating that a payment is overdue.

Figure 7:
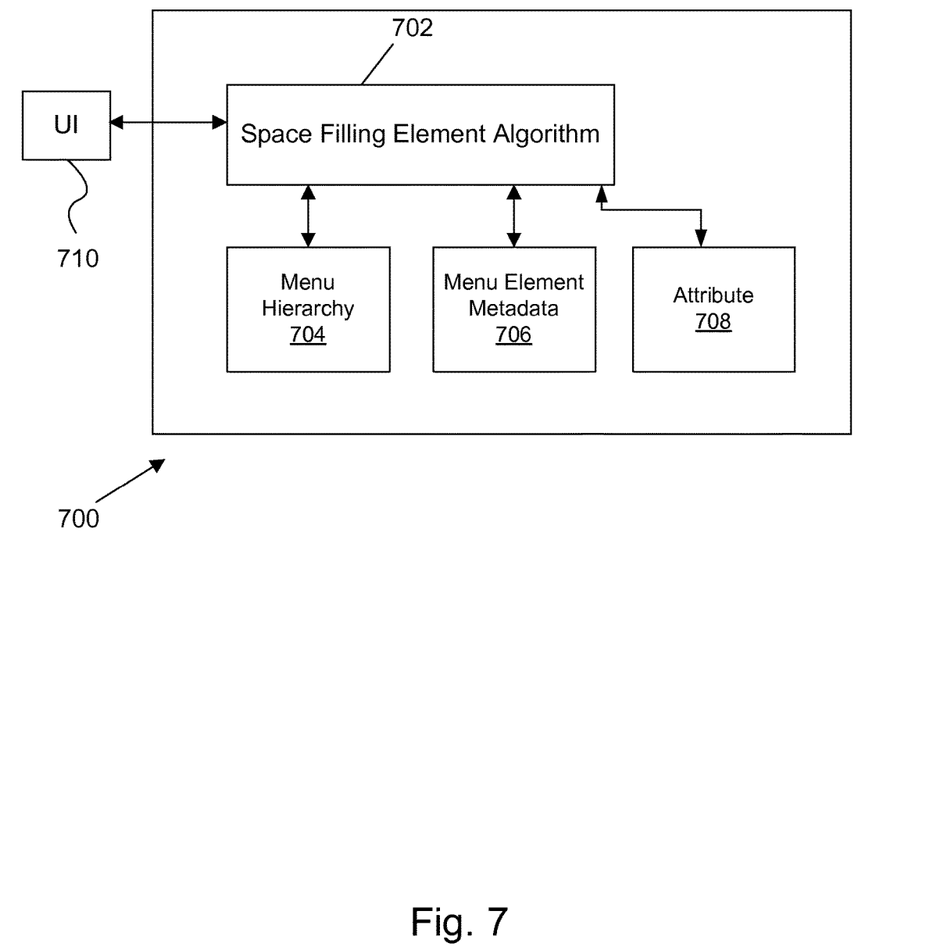
FIG. 7 illustrates a block diagram of an example embodiment implemented on a computer system.

FIG. 7 is a block diagram of an example embodiment implemented on a computer system 700. In the following a computer system may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

In FIG. 7 a space filling element algorithm module 702 has access to a menu hierarchy module 704, a menu element metadata module 706 and an attribute module 708. The space filling element algorithm module 702 is connected to a user interface (UI) 710.

In this example embodiment, as described above with reference to FIGS. 5 and 6, the number of accesses for each menu item is used as the default value for controlling the relative size of a space filling element.

One type of metadata used in the embodiments is watch list metadata indicating whether an application invoked by a tile is included in a watch list. In the following a watch list is a function that notifies users of which applications need to be monitored by a user. In one embodiment, all menu items included in the watch list are displayed as tiles by the space filling element module and then the relative sizes of the tiles are adjusted according to the number of accesses. In one embodiment, all menu items included in the watch list are displayed as tiles by the space filling element module and then the relative sizes of the tiles are adjusted according to the number of accesses. The tile sizes (or other attribute) do not necessarily have to change with respect to another variable, for example if only color changed (given a relevant color map), the space filling element representation would then be a heat map instead of to a treemap.

Alternatively a tile, such as the AP tile, has a color attribute indicating the tile is on the watch list.

Figure 8:
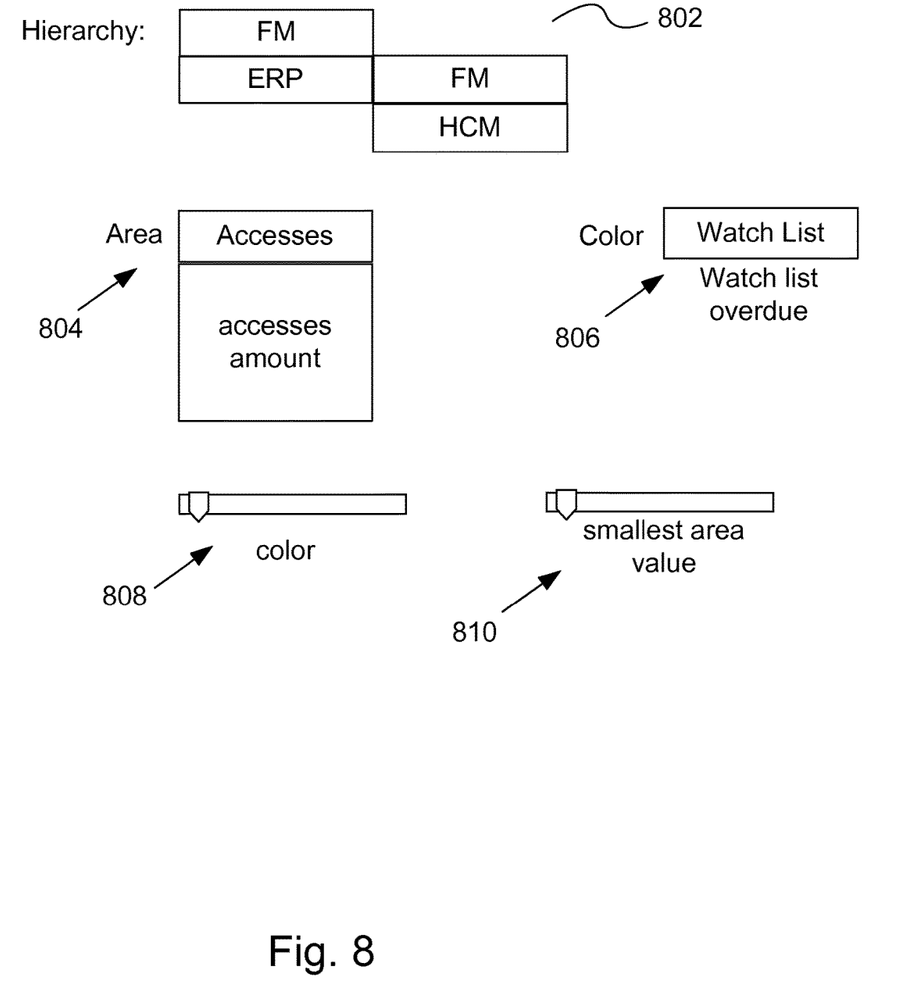
FIG. 8 illustrates an example of a user interface (UI) for configuring the space filling element algorithm.

FIG. 8 depicts an example of a UI 710 for configuring the space filling element algorithm. In this example the UI is used to configure the space filling algorithm to create the tiles of FIG. 6.

In FIG. 8 a hierarchy selecting drop down list 802 allows a user to select the menu level to be displayed. In some embodiments multiple levels may be displayed. In this example the user has selected the FM menu level. In an alternative embodiment a slider bar, or other controls such as a gesture-based control, may be used to select an application pillar of the ERP application suite.

An area selecting drop down list 804 allows a user to select a characteristic, such as number of accesses, dollar amount, etc., of the selected menu level to be represented by the area attribute of the space filling element. In this example, the number of accesses is selected as the characteristic. The displayed characteristics may vary depending on the menu level selected.

A color selecting drop down list 806 allows a user to select a characteristic, such as whether the level is on a watch list, whether amounts are overdue, etc., of the selected menu level to be indicated by varying the color attribute of the space filling element. The displayed characteristics may vary depending on the menu level selected.

The color value of the color attribute and a minimum size of the area attribute are adjusted by slider bars 808 and 810.

Figure 9:
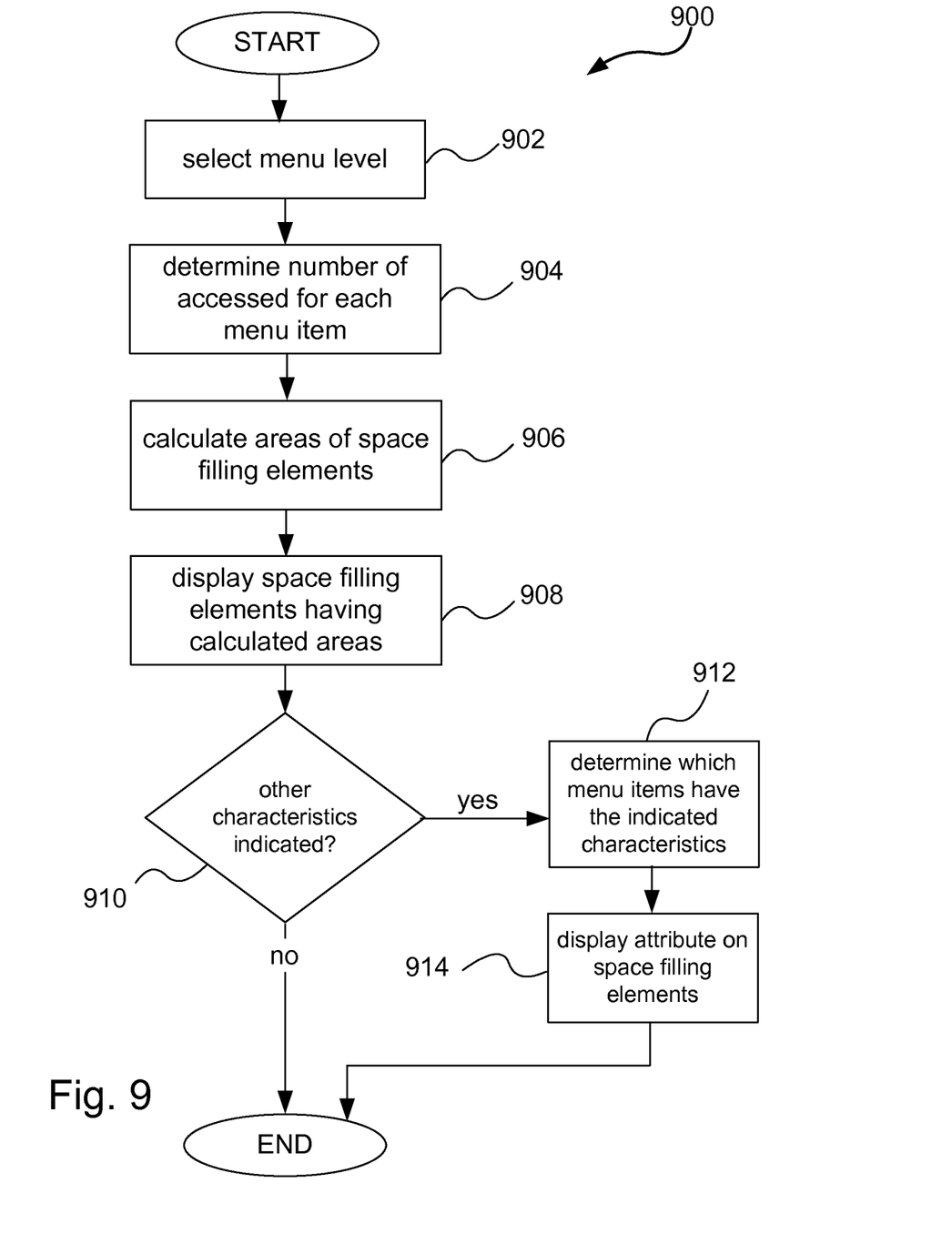
FIG. 9 illustrates a flow chart depicting steps performed by a computer system to implement an example embodiment.

FIG. 9 is a flow chart 900 depicting steps performed by a computer system to implement an example embodiment. In process step 902 a menu level is selected based on user input.

In process set 904 metadata is accessed indicating the number of accesses to each item in the selected menu level.

In process step 906 area values of space filling elements representing each item in the selected menu level are calculated. The area values are proportioned to indicate the number of accesses to each level. In some embodiments, an item having no accesses will be assigned a minimum area value. The minimum area value would likely be configured by either an application administrator or the end user.

In process step 908 the space filling elements are displayed on a computer display with displayed space filling elements having the areas calculated in process step 906. The space filling elements may be displayed, for example, as tiles or as a treemap.

In process step 910 it is determined whether a second characteristic of the menu level items is to be indicated by the space filling elements.

If YES, then in process step 912 metadata for each menu level item is accessed to determine whether a menu item has the second characteristic. In process step 914 a selected attribute, such as a color, a texture, etc., is assigned to and displayed on each space filling element having the second characteristic.

If NO, the process exits.

Although the description has been described with respect to particular embodiments thereof, these particular embodiments are merely illustrative, and not restrictive. In some embodiments space filling elements other that rectangles could be used such as, for example, circles, ellipses, dialog balloons, etc.

In one example embodiment, space filling elements are manifested as live tiles in a Windows 8® environment. As described above, the size of the tiles is varied according to frequency of use and menu items that are accessed frequently are represented as large tiles and menu items accessed infrequently are represented as smaller tiles.

In this embodiment, the live tiles display text from within the application associated with the tile. In the case of a watch list, sizing of the tiles represents counts of an item in the watch list and each tile displays a scrolling notification. In this example another tile attribute, such as color, represents, for example, the number of actions awaiting the user in the application associated with the tile.

The various embodiments provide a dynamic space filling element orientation to enterprise application navigation, making navigation to important active applications easy and avoiding cluttering the computer display with unimportant, inactive applications.

Figure 10:
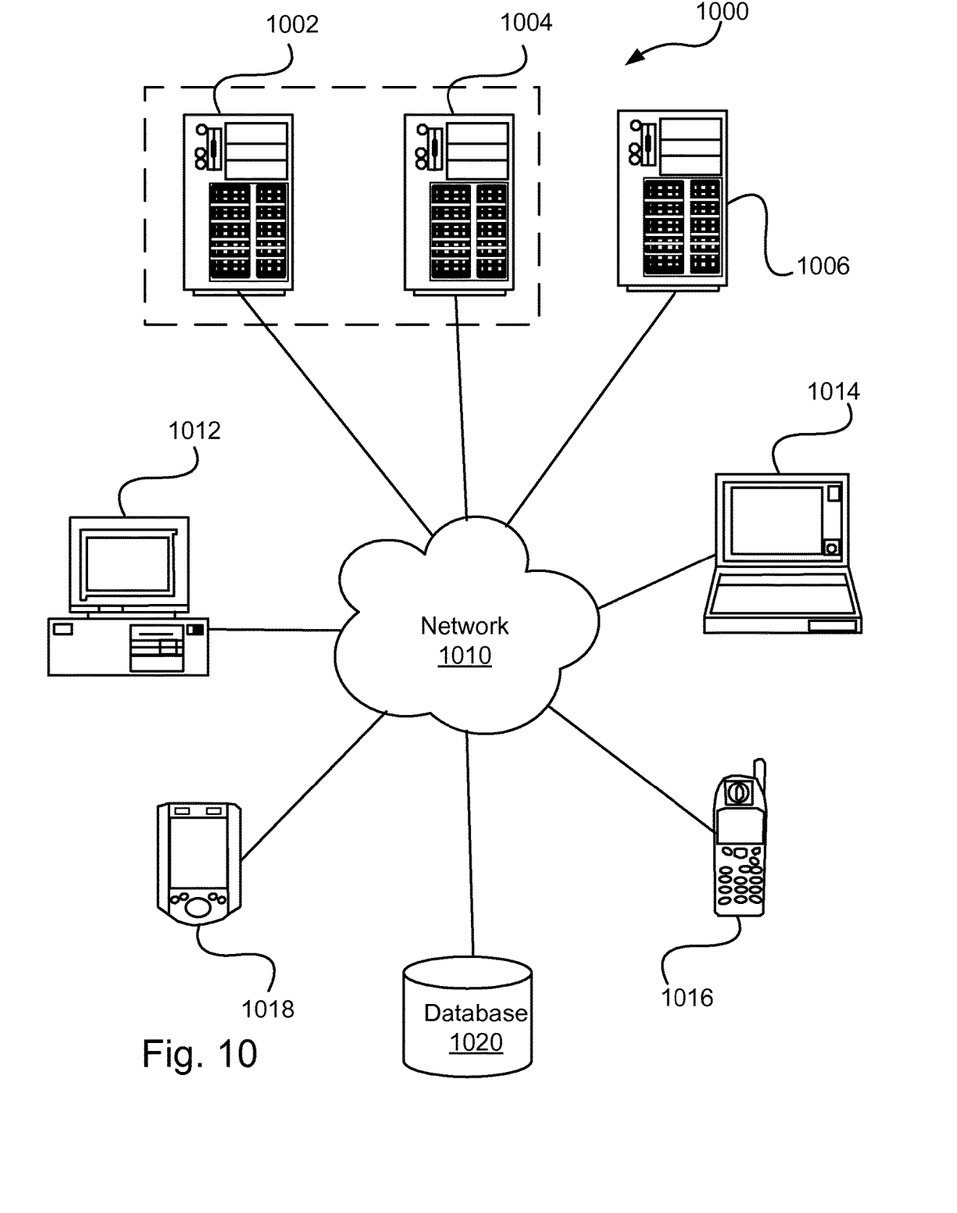
FIG. 10 is a block diagram illustrating components of an example operating environment in which various embodiments of the present invention may be implemented.

FIG. 10 is a block diagram illustrating components of an example operating environment in which various embodiments of the present invention may be implemented. The system 1000 can include one or more user computers, computing devices, or processing devices 1012, 1014, 1016, 1018, which can be used to operate a client, such as a dedicated application, web browser, etc. The user computers 1012, 1014, 1016, 1018 can be general purpose personal computers (including, merely by way of example, personal computers, tablet computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1012, 1014, 1016, 1018 may also have any of a variety of applications, including one or more development systems, database client and/or server applications, and Web browser applications. Alternatively, the user computers 1012, 1014, 1016, 1018 may be any other electronic device, such as a thin-client computer, Internet-enabled gaming system, and/or personal messaging device, capable of communicating via a network (e.g., the network 1010 described below) and/or displaying and navigating Web pages or other types of electronic documents. Although the example system 1000 is shown with four user computers, any number of user computers may be supported.

In most embodiments, the system 1000 includes some type of network 1010. The network may be any type of network familiar to those skilled in the art that can support data communications using any of a variety of commercially-available protocols, including without limitation TCP/IP, SNA, IPX, AppleTalk, and the like. Merely by way of example, the network 1010 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 1002, 1004, 1006 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1006) may be dedicated to running applications, such as a business application, a Web server, application server, etc. Such servers may be used to process requests from user computers 1012, 1014, 1016, 1018. The applications can also include any number of applications for controlling access to resources of the servers 1002, 1004, 1006.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1012, 1014, 1016, 1018. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 1012, 1014, 1016, 1018.

The system 1000 may also include one or more databases 1020. The database(s) 1020 may reside in a variety of locations. By way of example, a database 1020 may reside on a storage medium local to (and/or resident in) one or more of the computers 1002, 1004, 1006, 1012, 1014, 1016, 1018. Alternatively, it may be remote from any or all of the computers 1002, 1004, 1006, 1012, 1014, 1016, 1018, and/or in communication (e.g., via the network 1010) with one or more of these. In a particular set of embodiments, the database 1020 may reside in a storage-area network ("SAN") familiar to those skilled in the art. Similarly, any necessary files for performing the functions attributed to the computers 1002, 1004, 1006, 1012, 1014, 1016, 1018 may be stored locally on the respective computer and/or remotely, as appropriate. In one set of embodiments, the database 1020 may be a relational database, such as Oracle 10 g, that is adapted to store, update, and retrieve data in response to SQL-formatted commands.

Figure 11:
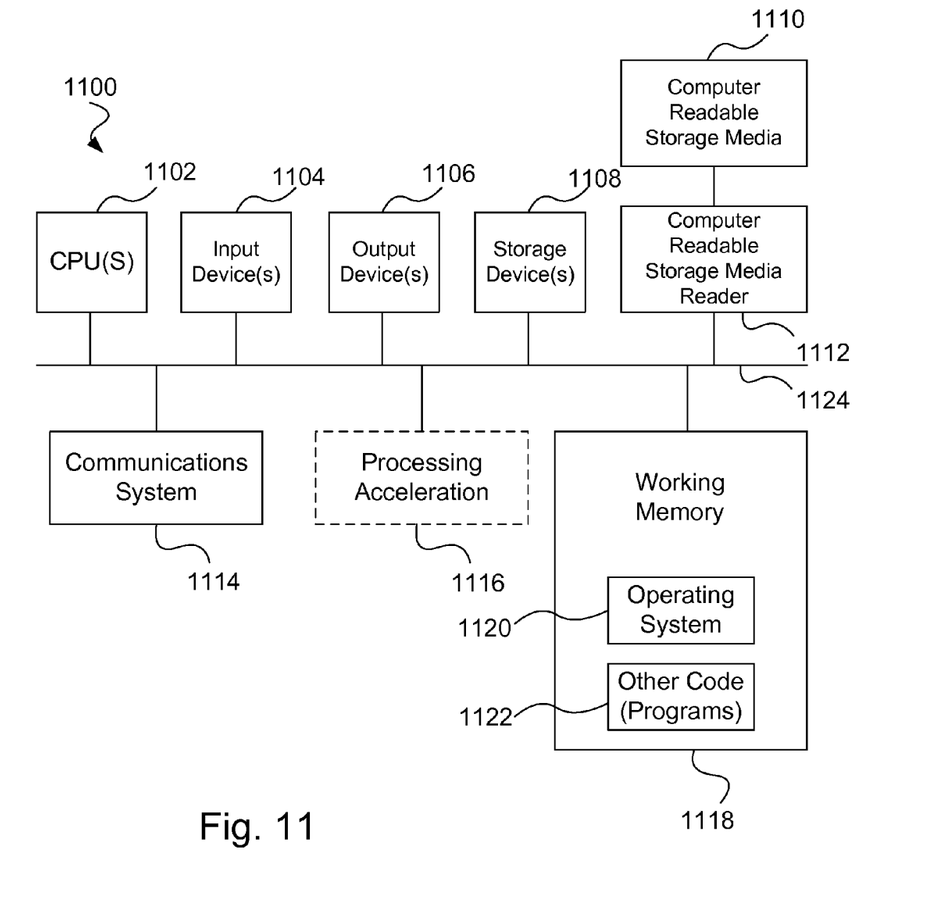
FIG. 11 illustrates an example computer system in which various embodiments of the present invention may be implemented.

FIG. 11 illustrates an example computer system 1100, in which various embodiments of the present invention may be implemented. The system 1100 may be used to implement any of the computer systems described above. The computer system 1100 is shown comprising hardware elements that may be electrically coupled via a bus 1124. The hardware elements may include one or more central processing units (CPUs) 1102, one or more input devices 1104 (e.g., a mouse, a keyboard, etc.), and one or more output devices 1106 (e.g., a display device, a printer, etc.). The computer system 1100 may also include one or more storage devices 1108. By way of example, the storage device(s) 1108 can include devices such as disk drives, optical storage devices, solid-state storage device such as a random access memory ("RAM") and/or a read-only memory ("ROM"), which can be programmable, flash-updateable and/or the like.

The computer system 1100 may additionally include a computer-readable storage media reader 1112, a communications system 1114 (e.g., a modem, a network card (wireless or wired), an infra-red communication device, etc.), and working memory 1118, which may include RAM and ROM devices as described above. In some embodiments, the computer system 1100 may also include a processing acceleration unit 1116, which can include a digital signal processor DSP, a special-purpose processor, and/or the like.

The computer-readable storage media reader 1112 can further be connected to a computer-readable storage medium 1110, together (and, optionally, in combination with storage device(s) 1108) comprehensively representing remote, local, fixed, and/or removable storage devices plus storage media for temporarily and/or more permanently containing computer-readable information. The communications system 1114 may permit data to be exchanged with the network and/or any other computer described above with respect to the system 1100.

The computer system 1100 may also comprise software elements, shown as being currently located within a working memory 1118, including an operating system 1120 and/or other code 1122, such as an application program (which may be a client application, Web browser, mid-tier application, RDBMS, etc.). It should be appreciated that alternate embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices and field programmable gate arrays. Optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine readable medium to permit a computer to perform any of the methods described above.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material within the essential scope and spirit.

We claim:

1. An apparatus comprising:
   one or more processors;
   a computer display coupled to the one or more processors; and
   logic encoded in one or more non-transitory computer readable media for execution by the one or more processors and with the one or more processors, when executing the logic, performing the acts of:
   displaying, on the computer display, a tree structure mapping a hierarchical menu structure, with the hierarchical menu structure configured to allow access to files or software options and where the tree structure is a visual representation of the hierarchical menu structure, with the tree structure including a plurality of sized two-dimensional space filling elements with each element having a default area value and each element representing one or more levels of the hierarchical menu structure, where a plurality of second level sized two-dimensional space filling elements represent lower levels of a first level of the hierarchical menu structure represented by a first level sized two-dimensional space filling element;
   accumulating numbers of accesses to each level of the hierarchical menu structure over a time period;
   calculating, by the processor, dynamic area values for each space filling element, with the dynamic area value of the first level sized two-dimensional space filling element being proportional to a number of accesses to the first level of the hierarchical menu structure and with the dynamic area value of each second level sized two-dimensional space filling element being proportional to a ratio of a number of accesses to the corresponding second level of the hierarchical menu structure to the number of accesses to the first level of the hierarchical menu structure so that the sized two-dimensional space filling elements that are frequently accessed have a proportionally larger dynamic area value than the sized two-dimensional space filling elements that are less frequently accessed; and
   displaying, on the computer display, the plurality of space filling elements as tiles representing the tree structure, wherein the dimensions of each tile are sized according to the calculated dynamic area value for each corresponding space filling element.

2. The apparatus of claim 1, with the one or more processors, when executing the logic, performing the further acts of:
   calculating the default value of a space filling element associated with a level of the hierarchical menu structure that has not been accessed.

3. The apparatus of claim 1, with the one or more processors, when executing the logic, performing the further acts of:
   accessing metadata for a particular level of the hierarchical menu structure to determine whether a selected activity is associated with the particular level of the hierarchical menu structure;
   assigning a first attribute to a particular space filling element associated with the particular level of the hierarchical menu structure when the selected activity is associated with the particular level of the hierarchical menu structure; and
   altering the display of the particular space filling element according to an assigned attribute.

4. The apparatus of claim 3 where the selected activity comprises indicating that the particular level of the hierarchical menu structure is in a watchlist.

5. The apparatus of claim 3 where the selected activity comprises indicating that the particular level of the hierarchical menu structure is high priority.

6. A method, performed by a computer system, comprising:
   displaying, by the computer system on a computer display, a tree structure mapping a hierarchical menu structure, with the hierarchical menu structure configured to allow access to files or software options and where the tree structure is a visual representation of the hierarchical menu structure, with the tree structure including a plurality of sized two-dimensional space filling elements with each element having a default area value and each element representing one or more levels of the hierarchical menu structure, where a plurality of second level sized two-dimensional space filling elements represent lower levels of a first level of the hierarchical menu structure represented by a first level sized two-dimensional space filling element;

accumulating, by the computer system, numbers of accesses to each level of the hierarchical menu structure over a time period;

calculating, by a processor of the computer system, dynamic area values for each space filling element, with the dynamic area value of the first level sized two-dimensional space filling element being proportional to a number of accesses to the first level of the hierarchical menu structure and with the dynamic area value of each second level sized two-dimensional space filling element being proportional to a ratio of a number of accesses to the corresponding second level of the hierarchical menu structure to the number of accesses to the first level of the hierarchical menu structure so that the sized two-dimensional space filling elements that are frequently accessed have a proportionally larger dynamic area value than the sized two-dimensional space filling elements that are less frequently accessed; and displaying, on the computer display, the plurality of space filling elements as tiles representing the tree structure, wherein the dimensions of each tile are sized according to the calculated dynamic area value for each corresponding space filling element.

7. The method of claim 6 further comprising:

calculating, by the computer system, the default area value of a space filling element associated with a level of the hierarchical menu structure that has not been accessed.

8. The method of claim 6 further comprising:

accessing, by the computer system, metadata for a particular level of the hierarchical menu structure to determine whether a selected activity is associated with the particular level of the hierarchical menu structure;

assigning, by the computer system, a first attribute to a particular space filling element associated with the particular level of the hierarchical menu structure when the selected activity is associated with the particular level of the hierarchical menu structure; and altering, by the computer system, the display of the particular space filling element according to an assigned attribute.

9. The method of claim 8 where the selected activity comprises indicating that the particular level of the hierarchical menu structure is in a watchlist.

10. The method of claim 8 where the selected activity comprises indicating that the particular level of the hierarchical menu structure is high priority.

11. A non-transitory computer readable storage medium comprising encoded program code for execution by one or more computer processors on a computer, the program code when executed is executable to perform the acts of:

displaying, on a computer display, a tree structure mapping a hierarchical menu structure, with the hierarchical menu structure configured to allow access to files or software options and where the tree structure is a visual representation of the hierarchical menu structure, with the tree structure including a plurality of sized two-dimensional space filling elements with each element having a default area value and each element representing one or more levels of the hierarchical menu structure, where a plurality of second level sized two-dimensional space filling elements represent lower levels of a first level of the hierarchical menu structure represented by a first level sized two-dimensional space filling element;

accumulating numbers of accesses to each level of the hierarchical menu structure over a time period;

calculating, by the one or more processors, dynamic area values for each space filling element, with the dynamic area value of the first level sized two-dimensional space filling element being proportional to a number of accesses to the first level of the hierarchical menu structure and with the dynamic area value of each second level sized two-dimensional space filling element being proportional to a ratio of a number of accesses to the corresponding second level of the hierarchical menu structure to the number of accesses to the first level of the hierarchical menu structure so that the sized two-dimensional space filling elements that are frequently accessed have a proportionally larger dynamic area value than the sized two-dimensional space filling elements that are less frequently accessed; and displaying, on the computer display, the plurality of space filling elements as tiles representing the tree structure, wherein the dimensions of each tile are sized according to the calculated dynamic area value for each corresponding space filling element.

12. The non-transitory computer readable storage medium of claim 11 further comprising program code that is executable to perform the act of:

calculating the default area value of a space filling element associated with a level of the hierarchical menu structure that has not been accessed.

13. The non-transitory computer readable storage medium of claim 11 further comprising program code that is executable to perform the acts of:

accessing metadata for a particular level of the hierarchical menu structure to determine whether a selected activity is associated with the particular level of the hierarchical menu structure;

assigning a first attribute to a particular space filling element associated with the particular level of the hierarchical menu structure when the selected activity is associated with the particular level of the hierarchical menu structure; and altering the display of the particular space filling element according to an assigned attribute.

14. The non-transitory computer readable storage medium of claim 13 where the selected activity comprises indicating that the particular level of the hierarchical menu structure is in a watchlist.

15. The non-transitory computer readable storage medium of claim 13 where the selected activity comprises indicating that the particular level of the hierarchical menu structure is high priority.

* * * * *

UNITED STATES PATENT AND TRADEMARK OFFICE
CERTIFICATE OF CORRECTION

PATENT NO.        : 9,608,869 B2
APPLICATION NO.   : 14/033362
DATED             : March 28, 2017
INVENTOR(S)       : King et al.

It is certified that error appears in the above-identified patent and that said Letters Patent is hereby corrected as shown below:

In the Specification

In Column 1, Line 12, delete "enterpirse." and insert -- enterprise. --, therefor.

In Column 1, Line 30, after "Suite™" insert -- , --.

In Column 2, Line 23, delete "embodiments." and insert -- embodiments; --, therefor.

In Column 2, Line 32, delete "algorithm." and insert -- algorithm; --, therefor.

Signed and Sealed this
Second Day of January, 2018

Joseph Matal
*Performing the Functions and Duties of the
Under Secretary of Commerce for Intellectual Property and
Director of the United States Patent and Trademark Office*